June 9, 1942.  W. F. RIDGWAY  2,285,463

PERMANENT MAGNET GENERATOR

Filed Nov. 3, 1939

INVENTOR
William F. Ridgway
By Parker, Carlson, Pitzner & Hubbard
ATTORNEYS

Patented June 9, 1942

2,285,463

UNITED STATES PATENT OFFICE 2,285,463

PERMANENT MAGNET GENERATOR

William F. Ridgway, Rockford, Ill.

Application November 3, 1939, Serial No. 302,676

3 Claims. (Cl. 171—209)

The invention relates to improvements in permanent magnet generators or magnetos and more particularly to such generators which are arranged to be driven by a prime mover having a speed subject to variation throughout a very wide range.

Generators embodying the present invention are especially adapted for use on bicycles to supply current for a head lamp, tail light, etc. It has heretofore been proposed to provide for use on bicycles a small generator adapted to use one of the bicycle wheels as a prime mover. Immediately, however, a serious problem arises of output voltage variation due to the inherent changes in prime mover speed. If the lamp to be lighted normally requires current at, say, six volts, the generator must be such as to supply substantially this voltage at even a walking speed and, on the other hand, the generator voltage must not exceed six volts by any very large percentage at the maximum speeds obtainable in bicycles. It is apparent that if the output voltage of the generator should increase in direct proportion to increases in speed the lamp would soon be burned out because of the excessive voltage.

The general object of the present invention is to provide a permanent magnet generator embodying a novel form of magnetic shunt so arranged as to limit effectually the output voltage of the device even at high prime mover speeds without interfering with the production of a required minimum voltage at even very low prime mover speeds.

More particularly, it is an object of the invention to provide a generator embodying a shunt of the type indicated above, which is very cheap to manufacture by virtue not only of the simplicity of the shunt structure itself but also of the mode of its application to the generator in the course of the latter's assembly.

Further objects and advantages of the invention will become apparent as the following description proceeds, taken in connection with the accompanying drawing in which.

Figure 1:
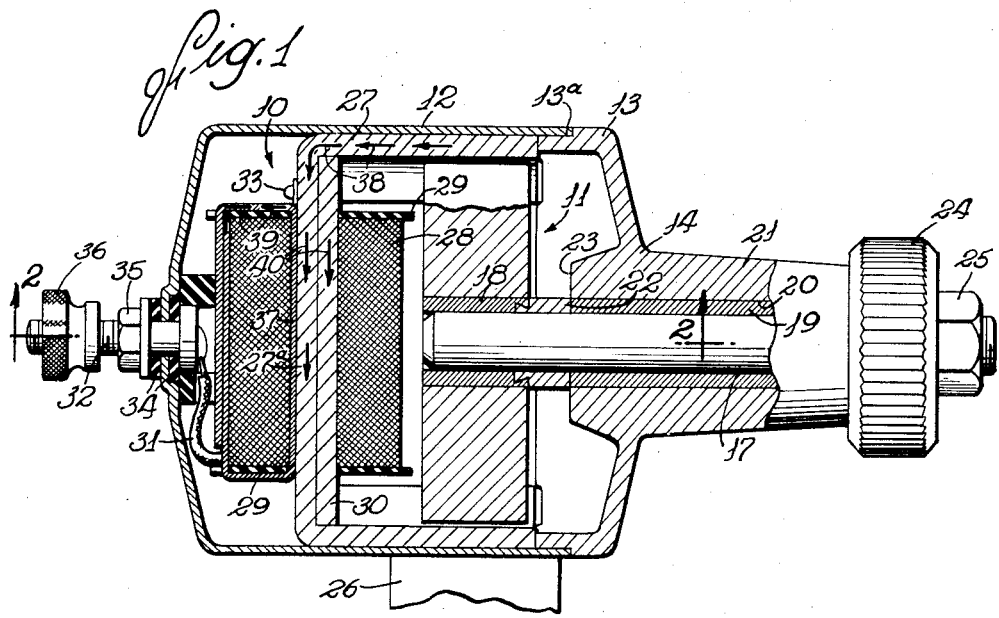
Figure 1 is a side elevation partially in longitudinal section of a permanent magnet generator embodying the invention.

For purposes of exemplification, the invention has been illustrated herein as embodied in a permanent magnet generator particularly adapted for use in the lighting system of a bicycle. Generators embodying the present invention are especially adapted for such use because of their ability to produce a regulated output voltage despite wide fluctuations in prime mover speed. It will be apparent to those skilled in the art, however, that generators embodying the invention may also be adapted for other uses where such a regulated voltage characteristic is desired. Accordingly, even though one particular embodiment and application of the invention have been shown and described in some detail there is no intention to thereby limit the invention to such embodiment or application but, on the other hand, the appended claims are intended to cover all modifications and alternative constructions falling within the spirit and scope of the invention.

In the instant embodiment the genertator (Fig. 1) includes a stator or field structure and a permanent magnet rotor or armature, designated generally by the respective reference numerals 10 and 11. These cooperating parts are disposed within a dust proof housing comprising a cup-shaped sheet metal casing arranged with its lower edge portion telescoped over a circular flange 13 fashioned on the periphery of a base casting 14. The exterior of the flange 13 is peripherally recessed as indicated at 13ª so that the outer wall of the casing 12 will be flush with the adjacent portion of the flange. To hold the casing 12 removably in position on the base 14 an L-shaped bracket 15 (Fig. 2) is riveted on the interior of the casing and is fixed to the base 14 by screw 16.

Figure 3:
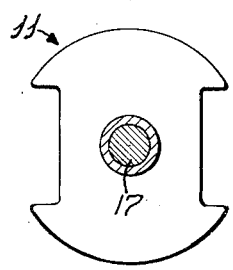
Fig. 3 is a detail plan view of the generator rotor.

The rotor 11 is fashioned from a block of magnetizable material having a high degree of retentivity and is permanently magnetized. Alnico has been found to be a suitable material for this purpose. The periphery of the rotor is fashioned to present salient poles (Fig. 3) cooperating with fixed pole pieces on the stator 10 hereinafter described. To support the rotor 11, a shaft 17 (Fig. 1) is utilized, this shaft being fixed to the rotor by fused metal 18. A substantial length of the shaft 17 is supported in a long sleeve bearing 19 mounted in a bore 20 fashioned in an axial extension 21 on the base casting 14, the rotor being carried on the overhanging or projecting end of the shaft. A spacing collar 22 having one end imbedded in the fused metal 18 is interposed between the rotor 11 and an opposed shoulder 23 fashioned on the base casting 14.

To drive the rotor 11 a roller 24 is fixed on the outer end of the shaft 17 by a nut 25 threaded on the shaft. A suitable bracket 26 secured to the generator housing serves to support the same in such position that the roller 24 contacts the periphery of a bicycle wheel and is thus driven by frictional contact with it. Accordingly, the bicycle wheel serves as a prime mover and drives the generator shaft 17, which is fixed to the roller 24.

Figure 2:
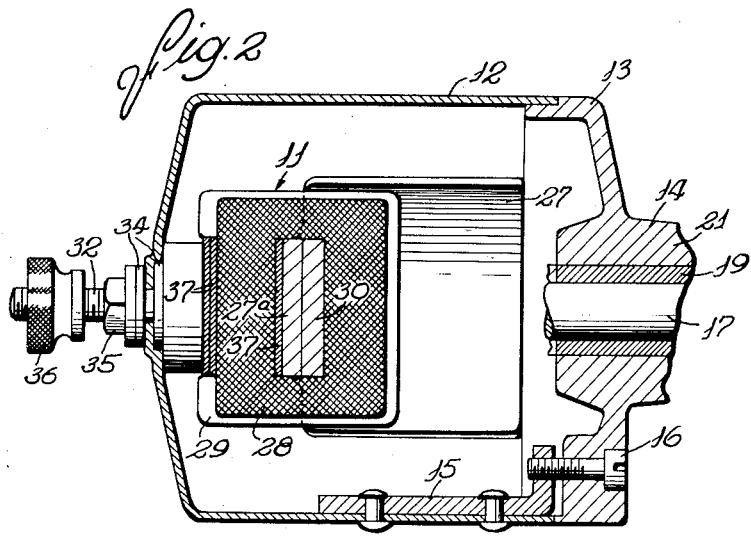
Fig. 2 is a horizontal sectional view along the line 2—2 in Fig. 1.

The stator 10 embodies a core 27 which is generally U-shaped in cross section (Fig. 1). This core is preferably fashioned as a dumbell-shaped sheet metal stamping and the end portions are bent up to form stator pole pieces presenting faces of curved configuration conforming to the curvature of the rotor periphery (see also Fig. 2). A stator winding 28 is coiled about the center or base portion 27a of the core 27 between spool ends 29 of insulating material. To give ample cross section for the portion of the core extending axially through the winding 28, a generally rectangular piece of metal 30 is placed in face-to-face relation with the central portion 27a of the core. There is thus no increase in magnetic reluctance at this point even though the width of the central core portion 27a is somewhat less than that of the end or pole piece portions (Fig. 2). The coil 28 which is wound about the pieces of metal 27a and 30 serves to hold them firmly together. Both of the core parts 27 and 30 are fashioned of sheet material having a high magnetic permeability, such as so-called Armco Ingot Iron.

One end of the stator winding 28 is connected through a lead 31 (Fig. 1) with an output terminal 32 and the other end of the coil is grounded to the stator core 27 by soldering it to the same as indicated at 33. The terminal 32 has been shown in the form of a bolt projecting through an aperture in the casing end wall and is insulated from the casing 12 by insulating washers 34. A nut 35 holds the terminal bolt in position on the casing and a knurled nut 36 is threaded on the outer end of the terminal.

To limit the output voltage of the generator described to a safe value a novel form of magnetic shunt has been provided in the stator structure 10. This shunt comprises a strip 37 of sheet meetal having a high magnetic permeability, such as so-called Armco Ingot Iron. In assembling the generator the central portion of the strip 37 is placed in face-to-face engagement with the outer side of the center portion 27a of the core. The winding 28 is tightly coiled about these superimposed parts and serves to hold them together. Upon the completion of the winding 28 the ends of the strip 27 are bent about the exterior of the winding so as to form a binding about it and the ends of the strip are overlapped to complete a magnetic shunt about the winding. Consequently flux passing through the core 27 along the path indicated, for example, by the arrows 38 is partially diverted through the strip 37 along the path indicated by the arrows 39 while the remainder passes through the core parts 27a and 30 along the path indicated by the arrows 40 (Fig. 1). It will be appreciated that the amount of flux diverted in this manner through the shunt 37 depends upon the saturation of the core parts 27a and 30. Consequently, at higher rotor speeds an increasingly larger amount of flux is diverted through the shunt. In this way the output voltage of the generator can be tapered off by an amount depending upon the magnetic reluctance of the shunt in comparison to the core parts 27a and 30. This reluctance can, of course, be governed as desired by the relative dimensions of the parts.

In the operation of the generator described the roller 24 is pressed against a rotating bicycle wheel or similar prime mover and thus causes the permanent magnet armature 11 to rotate. The rotation of this armature in turn sets up a pulsating flow of flux through the core 27 and it induces a voltage in the winding 28. The induced voltage is, of course, dependent upon the rate of change of the flux linking the winding 28 and, hence, upon the speed of the prime mover. The shunt 37 is, however, so proportioned that when the output voltage from the winding 28 tends to exceed a rated value of, say, six volts, the additional flux will be diverted through the shunt so that it does not link the coil 28 and, consequently, the output voltage is effectually limited to a safe value.

From the foregoing it will be seen that a very simple magnetic shunt arrangement has been provided such that when its cross sectional area is properly proportioned to that of the main core, the rate of increase in output voltage with increase in speed of rotation tapers off to a degree such that burning out of the lamp during the time high speed is maintained is unlikely, but, on the other hand, a useful minimum current is provided at the lowest operating speeds. The shunt is, however, so simple to construct and apply that it adds very little to the cost of the generator. It is, moreover, rugged in construction and does not embody any moving parts so that there is no danger of its getting out of order during use.

I claim as my invention:

1. In a generator of the type described, the combination of two strips of sheet metal having a high magnetic permeability, said strips being arranged in superimposed relation with their center portions in face-to-face engagement, a stator winding coiled about said central portions of the strips and holding the same in engagement, the end portions of one of said strips being arranged in opposed spaced relation to define a pair of pole pieces, a rotor disposed between said pole pieces, and the end portions of the other strip being bent about the exterior of said winding and in overlapping relation with each other to form a magnetic shunt about the winding.

2. In a generator of the type described, the combination of a stator winding of generally tubular form with a central and axially extending opening in it, a strip of highly magnetically permeable sheet metal bound about said winding and extending axially through said opening therein, and a stator core also having a high magnetic permeability extending through said winding opening and in direct contact with said strip.

3. A generator comprising, in combination, a U-shaped stator core fashioned as a stamping from sheet metal, a permanent magnet rotor rotatably mounted between the legs of the U, a stator winding coiled about the base of the U, and a voltage-limiting magnetic shunt in the form of a strip of highly magnetically permeable sheet metal disposed with its central portion within said winding and held by the latter in face-to-face contact with the base of the core U and with its end portions bent around the exterior of the winding to form a closed metal link embracing the winding.

WILLIAM F. RIDGWAY.